(12) United States Patent
Joseph

(10) Patent No.: US 7,844,901 B1
(45) Date of Patent: Nov. 30, 2010

(54) CIRCULAR TIMELINE FOR VIDEO TRIMMING

(75) Inventor: Jose Joseph, Uttarprad (IN)

(73) Assignee: Adobe Systems Incorporated, San Jose, CA (US)

( * ) Notice: Subject to any disclaimer, the term of this patent is extended or adjusted under 35 U.S.C. 154(b) by 901 days.

(21) Appl. No.: 11/725,848

(22) Filed: Mar. 20, 2007

(51) Int. Cl.
*G06F 3/00* (2006.01)

(52) U.S. Cl. .................. 715/716; 715/719; 715/723; 715/724; 715/725

(58) Field of Classification Search .............. 715/200, 715/723, 725, 726, 765, 716, 719
See application file for complete search history.

(56) References Cited

U.S. PATENT DOCUMENTS

| | | | | |
|---|---|---|---|---|
| 6,670,966 | B1 * | 12/2003 | Kusanagi | 715/723 |
| 7,030,872 | B2 * | 4/2006 | Tazaki | 345/418 |
| 7,043,137 | B2 * | 5/2006 | Slone | 386/55 |
| 7,062,713 | B2 * | 6/2006 | Schriever et al. | 715/723 |
| 7,073,127 | B2 * | 7/2006 | Zhao et al. | 715/719 |
| 7,299,416 | B2 * | 11/2007 | Jaeger | 715/716 |
| 7,623,755 | B2 * | 11/2009 | Kuspa | 386/55 |
| 7,739,599 | B2 * | 6/2010 | Patten et al. | 715/723 |
| 2007/0136679 | A1 * | 6/2007 | Yang | 715/772 |
| 2007/0183741 | A1 * | 8/2007 | Lerman et al. | 386/54 |
| 2007/0189708 | A1 * | 8/2007 | Lerman et al. | 386/52 |
| 2007/0198111 | A1 * | 8/2007 | Oetzel et al. | 700/94 |

* cited by examiner

*Primary Examiner*—Joshua D Campbell
*Assistant Examiner*—Christopher Bryant

(57) ABSTRACT

Methods and apparatus provide for a self-enclosed timeline trimmer to create a circular timeline placed over a video that graphically represents the entire duration of a video. Specifically, the self-enclosed timeline trimmer receives a video. The self-enclosed timeline trimmer generates a self-enclosed timeline to represent a duration of the video incremented according to a first unit of time. The self-enclosed timeline is layered over at least a portion of the video. The self-enclosed timeline trimmer represents a start of the video on the self-enclosed timeline and an end of the video on the self-enclosed timeline. The self-enclosed timeline trimmer displays the duration of the video in its entirety by connecting the start and the end of the video on the self-enclosed timeline. Further, the self-enclosed timeline trimmer is well suited for video editing on mobile computer devices, wireless computer devices, and for portable computer devices.

20 Claims, 9 Drawing Sheets

CIRCULAR TIMELINE FOR VIDEO TRIMMING

BACKGROUND

Conventional desktop software applications operate on computer systems to allow for users, known as film or video editors, to edit digital video content. Example edits that can be made to the video include splicing video segments together, applying effects to video, adding subtitles, and the like. Further, conventional video editing software uses a horizontal timeline to graphically represent a video's length of time during video editing. The horizontal timeline is presented on a particular time scale (e.g. seconds, minutes, hours) and includes a video tracker that is synchronized with the video. As a portion of the video is played, the video tracker travels along the horizontal timeline in order to show that portion's precise time placement with respect to the horizontal timeline. The user can also manipulate the video tracker and place it at any point along the horizontal timeline. When doing so, the video begins playing at the point in the time represented by the placement of the video tracker. Thus, if the video tracker is placed 90 seconds into a horizontal timeline representing a two minute video, then the video will begin playing at the precise video frame that occurs at the $90^{th}$ second of the two minute long video.

Video sharing websites, such as www.click.tv, provide user interface implementations based on such conventional horizontal timelines. On this site, a horizontal timeline is provided and the associated video is synchronized with comments. When the elapsed play time of the video matches the time of the text associated with the comment, the comment is shown in a separate box below the video. For example, if the video clip was a video recording of the latest speech by the President of the United States, comments could be added at certain points in the video clip of the President's speech. If the speech has a length of five minutes, a user may insert a comment at the 2:00 point, indicating that this part of the video clip of the President's speech talks about the economy. A second comment may be inserted at the 3:12 point indicating that this next part of the video clip of the President's speech deals with congressional hearings. A second user viewing the video clip of the President's speech would see the comments regarding the portions of the video clip when the video is played. When the video clip of the President's speech reached the 2:00 mark, the comment associated with that point would be shown. The comment regarding the economy would remain displayed until the video of the President's speech reached the 3:12 point at which time the comment regarding the economy would be replaced by the comment regarding the congressional hearings. Further, comments associated with the video clip could also be listed and the second user, by clicking on a particular comment, would be directed to that portion of the video clip.

SUMMARY

Such conventional horizontal timelines for video editing suffer from a variety of deficiencies. For example, a horizontal timeline is presented apart from the video it graphically represents. In particular, the horizontal timeline is often displayed beneath the video. Displaying the video and the horizontal timeline separately is problematic because it requires the user to shift focus back-and-forth from the video and the timeline. Shifting the user's focus complicates video editing as the user attempts to be particularly precise in regards to selecting a desired video edit and determining where on the timeline that edit is placed.

Another deficiency observed with conventional horizontal timelines is that the user is not provided with a full view of the entire horizontal timeline, and thereby the entire duration of the video. This makes selecting desired points along the horizontal timeline difficult. The user must spend time scrolling through the horizontal timeline or shrink the presentation of the horizontal timeline in order to find a desired point in time. The user wastes time during scrolling and a minimized view of the horizontal timeline can result in a less detailed presentation of the horizontal timeline.

Yet another deficiency of a conventional horizontal timeline is the inefficient use of display space. If the user is using a computer system with a compact display (e.g. cellular telephones, personal digital assistants) the effectiveness of horizontally representing the video's length of time is significantly reduced. In order to fit a compact display, a highly-detailed horizontal timeline would either present the horizontal timeline in small portions or, in order to fit larger portions of the horizontal timeline on the compact display, smaller graphics and text associated with the horizontal timeline has to be used. Neither option affords the user with adequate and useful timeline information when editing videos.

Techniques discussed herein significantly overcome the deficiencies of conventional applications such as those discussed above as well as additional techniques also known in the prior art. As will be discussed further, certain specific embodiments herein are directed to a self-enclosed timeline trimmer. The one or more embodiments of the self-enclosed timeline trimmer as described herein contrast with conventional horizontal timelines to allow a user to better focus on a self-enclosed timeline and video simultaneously, to provide a full-view of the entire self-enclosed timeline and to efficiently use space of a display (e.g. screen) for a computer system.

For example, in one embodiment, the self-enclosed timeline trimmer creates a self-enclosed (e.g. circular) timeline to graphically represent the entire duration of a video received for editing. The self-enclosed timeline is layered over the video and synchronized with the video. The user can use a single tool, a graphic selector, to select both an in-point and an out-point on the self-enclosed timeline. The in-point and the out-point define a desired span of time in the video. In other words, if the video is two minutes long, the user can place the in-point at the 1 minute mark of the self-enclosed timeline and can place the out-point at the 1:05 mark. Hence, the desired span of time defined by the in-point and out-point is 5 seconds. The frames that occur within the 5 second span of time are retained. The self-enclosed timeline trimmer renders the video to include only those frames that occur within the span of time (the 5 second span of time). In addition, the self-enclosed timeline trimmer regenerates the self-enclosed (e.g. circular) timeline to graphically represent the entire duration (5 seconds) of the rendered video.

Specifically, the self-enclosed timeline trimmer receives a video. The self-enclosed timeline trimmer generates a self-enclosed timeline to represent a duration of the video incremented according to a first unit of time. The self-enclosed timeline is layered over at least a portion of the video. The self-enclosed timeline trimmer represents a start of the video on the self-enclosed timeline and an end of the video on the self-enclosed timeline. The self-enclosed timeline trimmer displays the duration of the video in its entirety by connecting the start and the end of the video on the self-enclosed timeline. Further, the self-enclosed timeline trimmer is well suited for video editing on mobile computer devices (e.g. cellular telephones), wireless computer devices, and for portable computer devices (e.g. personal digital assistants).

Thus, a full view of the entire self-enclosed timeline is always displayed to the user. The self-enclosed timeline is directly layered over the video, thereby allowing the user to maintain focus both on the video as it plays and the self-enclosed timeline as it tracks the video. Further, the shape of the self-enclosed timeline provides for an efficient use of space and can be presented on computer devices with small display screens.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A., herein after referred to as "Adobe" and "Adobe Systems."

BRIEF DESCRIPTION OF THE DRAWINGS

The foregoing and other objects, features and advantages of the invention will be apparent from the following more particular description of embodiments of the methods and apparatus for generating a self-enclosed timeline to represent a duration of a video, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

According to embodiments herein, a self-enclosed timeline trimmer is configured to modify a video. The self-enclosed timeline is layered over the video and synchronized with the video. The user can use a single tool, a graphic selector, to select both an in-point and an out-point on the self-enclosed timeline. The in-point and the out-point define a desired span of time in the video, where the in-point is the beginning of the desired span of time and the out-point is the end of that desired span of time. In other words, if the video is two minutes long, the user can place the in-point at the 30 second mark of the self-enclosed timeline and can place the out-point at the 1:30 mark. Hence, the desired span of time defined by the in-point and out-point is 60 seconds. The frames that occur within the 60 second span of time are retained. The self-enclosed timeline trimmer renders the video to include only those frames that occur within the span of time (the 60 second span of time). In addition, the self-enclosed timeline trimmer regenerates the self-enclosed (e.g. circular) timeline to graphically represent the entire duration (60 seconds) of the rendered video.

The self-enclosed timeline trimmer is not limited to generating a circular timeline in order to represent a video from start to end. The self-enclosed timeline can be generated in any shape (e.g. triangular, rectangular, square) in order to display the duration of the video in its entirety by connecting the start and the end of the video. Hence, the advantage of the efficient use of space on computer devices with small display screens is maintained.

According to another embodiment, the self-enclosed timeline trimmer includes a self-enclosed (e.g. circular) timeline and a segment selector to select a segment of time on the self-enclosed timeline. The user can place the segment selector at any desired location on the self-enclosed timeline. The segment selector expands the segment (e.g. "zooms" the segment). In other words, the segment is enlarged and presented according to a smaller unit of time. As the segment is enlarged, the remainder of the self-enclosed timeline is that portion not included in the segment. The remainder shrinks (e.g. contracts) such that the expanded (e.g. "zoomed") segment can fit on the self-enclosed timeline to still display the entire duration of the video. The self-enclosed timeline trimmer also displays the expanded segment incremented in a smaller unit of time as compared to the remainder of the self-enclosed timeline. Further, the self-enclosed timeline trimmer synchronizes the video with the expanded segment to play the video frames that occur within the segment frame-by-frame in accordance to the new smaller unit of time.

Figure 1:
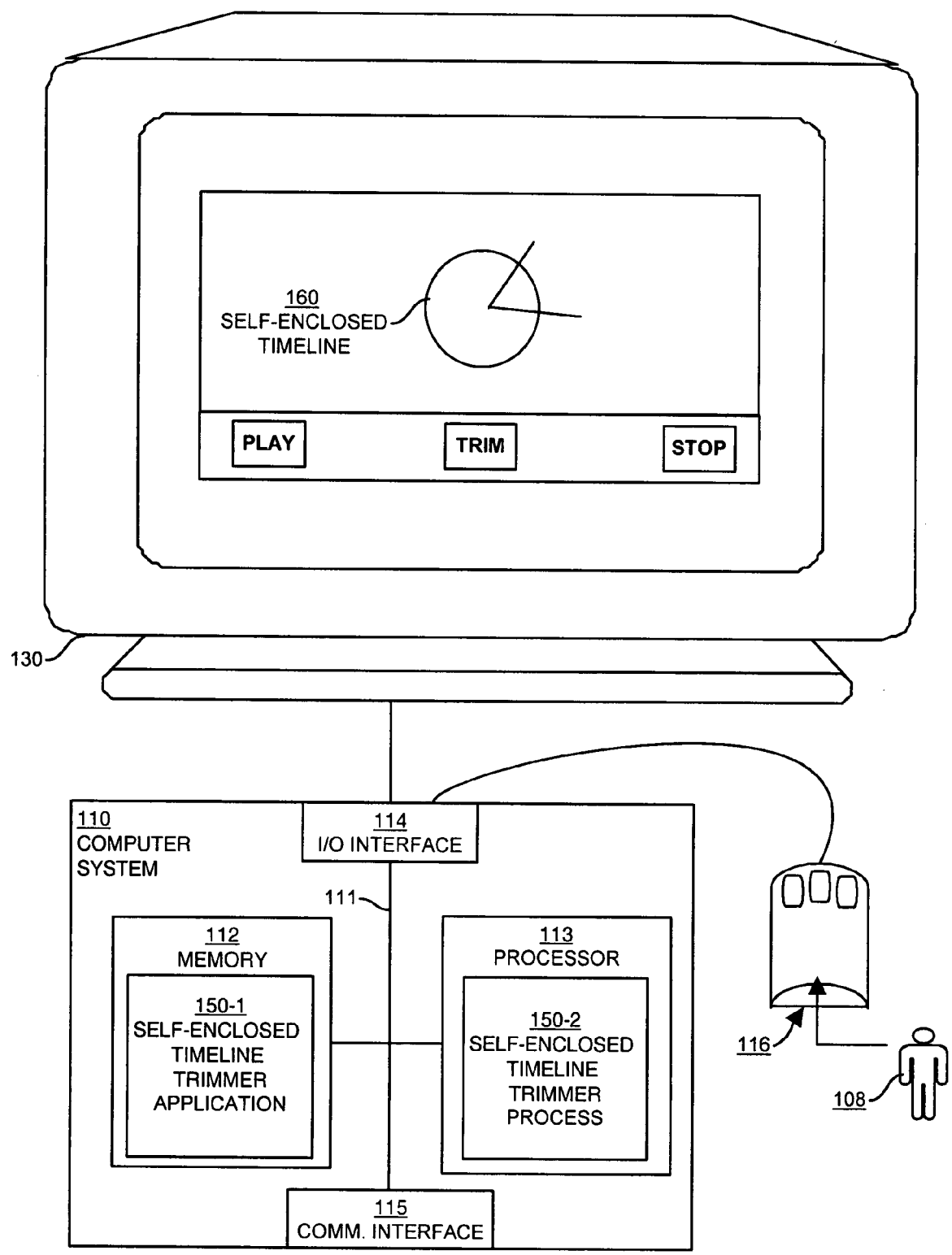
FIG. 1 is a block diagram of a computer system configured with a self-enclosed timeline trimmer according to embodiments herein.

Turning now to FIG. 1, a block diagram illustrates an example of architecture for a computer system 110 that executes, runs, interprets, operates or otherwise performs a self-enclosed timeline trimmer application 150-1 and/or self-enclosed timeline trimmer process 150-2 (e.g. an executing version of the application 150-1 controlled by user 108) according to embodiments herein. The computer system 110 may be any type of computerized device such as a personal computer, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a self-enclosed timeline trimmer application 150-1 that supports generation, display, and implementation of functional operations as will be further explained herein.

During operation of the computer system 110, the processor 113 accesses the memory system 112 via the interconnect 111 in order to launch, run, execute, interpret or otherwise perform the logic instructions of the self-enclosed timeline trimmer application 150-1. Execution of the self-enclosed timeline trimmer application 150-1 in this manner produces self-enclosed timeline trimmer process 150-2. In other words, the self-enclosed timeline trimmer process 150-2 represents one or more portions or runtime instances of the self-enclosed timeline trimmer application 150-1 (or the entire application 150-1) performing or executing within or upon the processor 113 in the computerized device 110 at runtime.

In one embodiment, the self-enclosed timeline trimmer 150 (e.g., self-enclosed timeline trimmer application 150-1 and/or self-enclosed timeline trimmer process 150-2) receives a video (not shown). The self-enclosed timeline trimmer 150 generates a self-enclosed timeline 160 to represent a duration of the video incremented according to a first unit of time. The self-enclosed timeline 160 is layered over at least a portion of the video. The self-enclosed timeline trimmer 150 represents a start of the video on the self-enclosed timeline and an end of the video on the self-enclosed timeline 160. The self-enclosed timeline trimmer 150 displays the duration of the video in its entirety by connecting the start and the end of the video on the self-enclosed timeline 160. Further, the self-enclosed timeline trimmer 150 is well suited for video editing (e.g. video trimming, video modification) on mobile computer devices (e.g. cellular telephones), wireless computer devices, and for portable computer devices (e.g. personal digital assistants).

Figure 2:
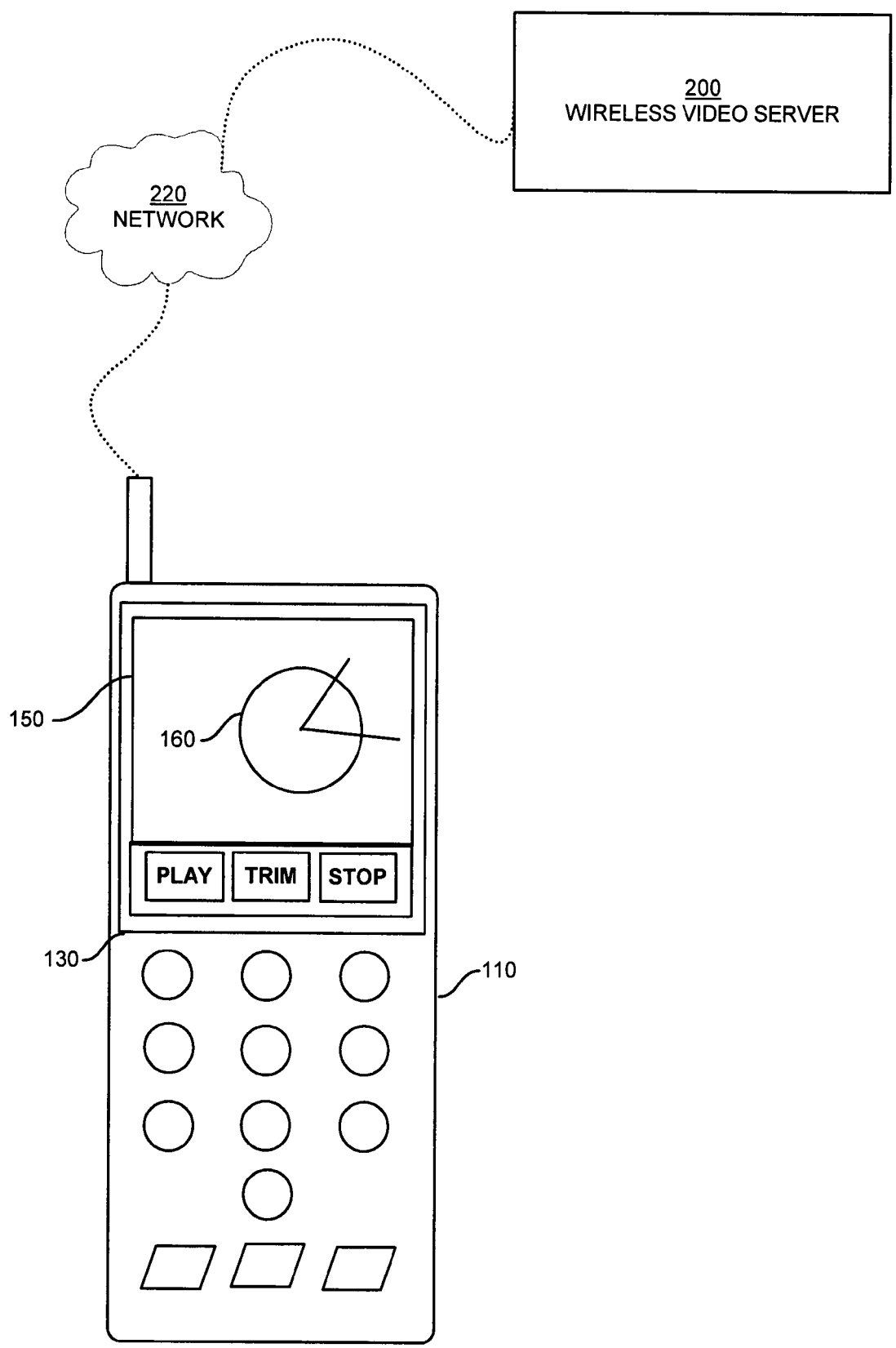
FIG. 2 is a block diagram of a computer system configured with a self-enclosed timeline trimmer according to embodiments herein.

Regarding FIG. 2, a block diagram of a computer system configured with a self-enclosed timeline trimmer 150 according to embodiments herein is illustrated. A computer device 110 is a cellular telephone (or mobile telephone). The cellular telephone 110 includes the self-enclosed timeline trimmer 150 presented on a display 130. A self-enclosed timeline 160 is placed over a video (not shown in FIGS. 2, 4, 6, 8) on the display 130 and the self-enclosed timeline 160 has a circular shape. The cellular telephone 110 communicates with a wireless server 200 to download a video to the cellular telephone 110 via a network 220.

Figure 3:
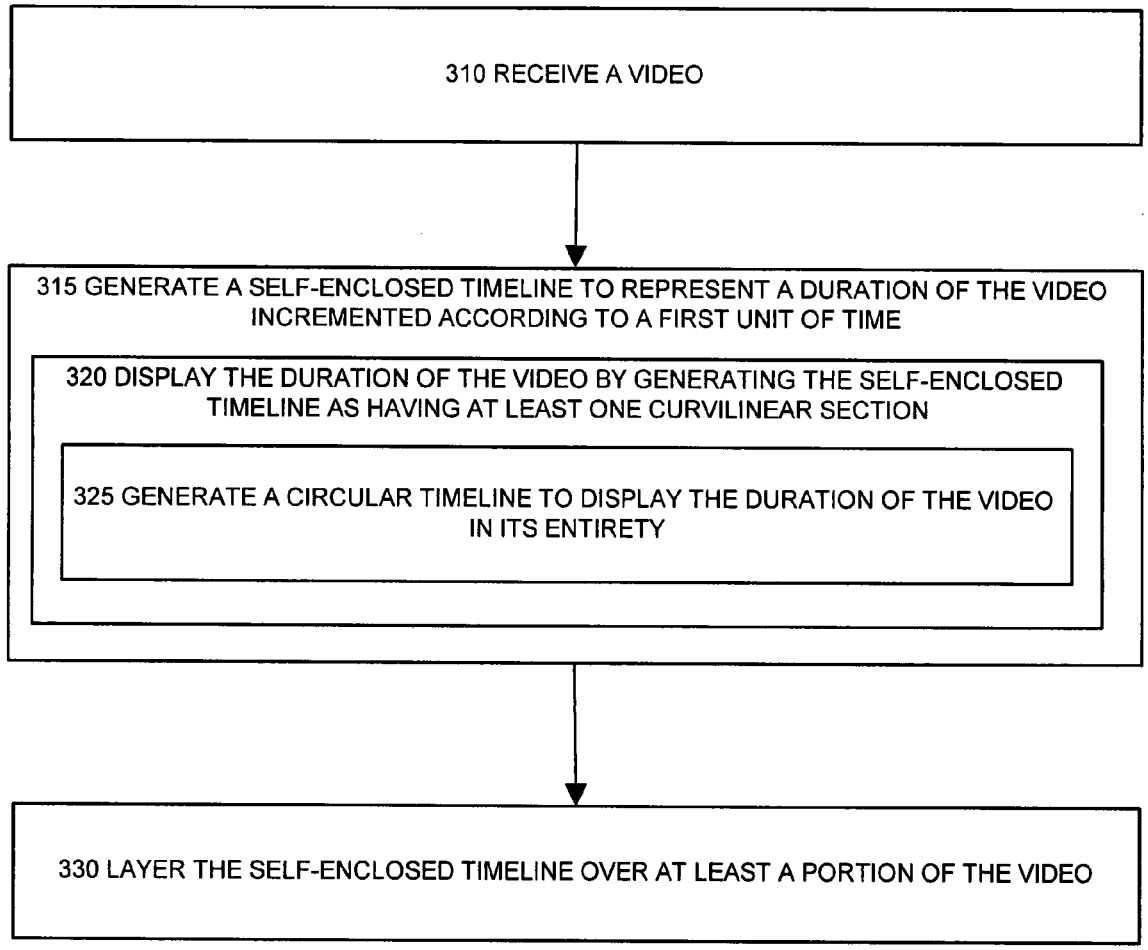
FIG. 3 is a flowchart of processing steps performed by the self-enclosed timeline trimmer according to embodiments herein.

FIG. 3 is a flowchart 300 of processing steps 310-330 performed by the self-enclosed timeline trimmer 150 according to embodiments herein. The steps in flowchart 300 refer to the features illustrated in the block diagram of FIG. 2.

In flowchart 300, at step 310, the self-enclosed timeline trimmer 150 receives a video. The video is sent over the network 220 from a server 200 and received at the cellular telephone 110. The cellular telephone 110, in conjunction with the self-enclosed timeline trimmer 150, can provide the user 108 with an interface (e.g. web browser, video player, online video service) to select, download, save, and store videos.

At step 315, the self-enclosed timeline trimmer 150 generates a self-enclosed timeline 160 to represent a duration of the video incremented according to a first unit of time (e.g. seconds, minutes, hours, etc.). It is understood that a self-enclosed timeline 160 is not a completely horizontal timeline. In particular, the self-enclosed timeline 160 is a timeline where a line could be drawn between one point on the timeline and another point on the timeline. Accordingly, self-enclosed timeline 160 can be generated in a variety of shapes such as, for example, a circle, a square, a rectangle, a triangle, an oval, or an "L" shape.

At step 320, the self-enclosed timeline trimmer 150 displays the duration of the video by generating the self-enclosed timeline 160 as having at least one curvilinear section, where self-enclosed timeline 160 has a portion exhibiting a curved appearance. In particular, at step 325, the self-enclosed timeline trimmer 150 generates a circular timeline to display the duration of the video in its entirety.

At step 330, the self-enclosed timeline trimmer 150 layers the self-enclosed timeline 160 over at least a portion of the video. In other words, the self-enclosed timeline 160 is placed over the video such that the user's 108 view of the video includes a view of the self-enclosed timeline 160 as well. The placement of the self-enclosed timeline 160 over the video need not be perfectly centered on the video. Instead, the placement can be off-center and adjusted by the user 108. Finally, while the computer device 110 in FIG. 1 is illustrated as a cellular telephone, it is understood for the purposes of this document that the computer device 110 can be any mobile computer device, a wireless computer device, and a portable computer device.

Figure 4:
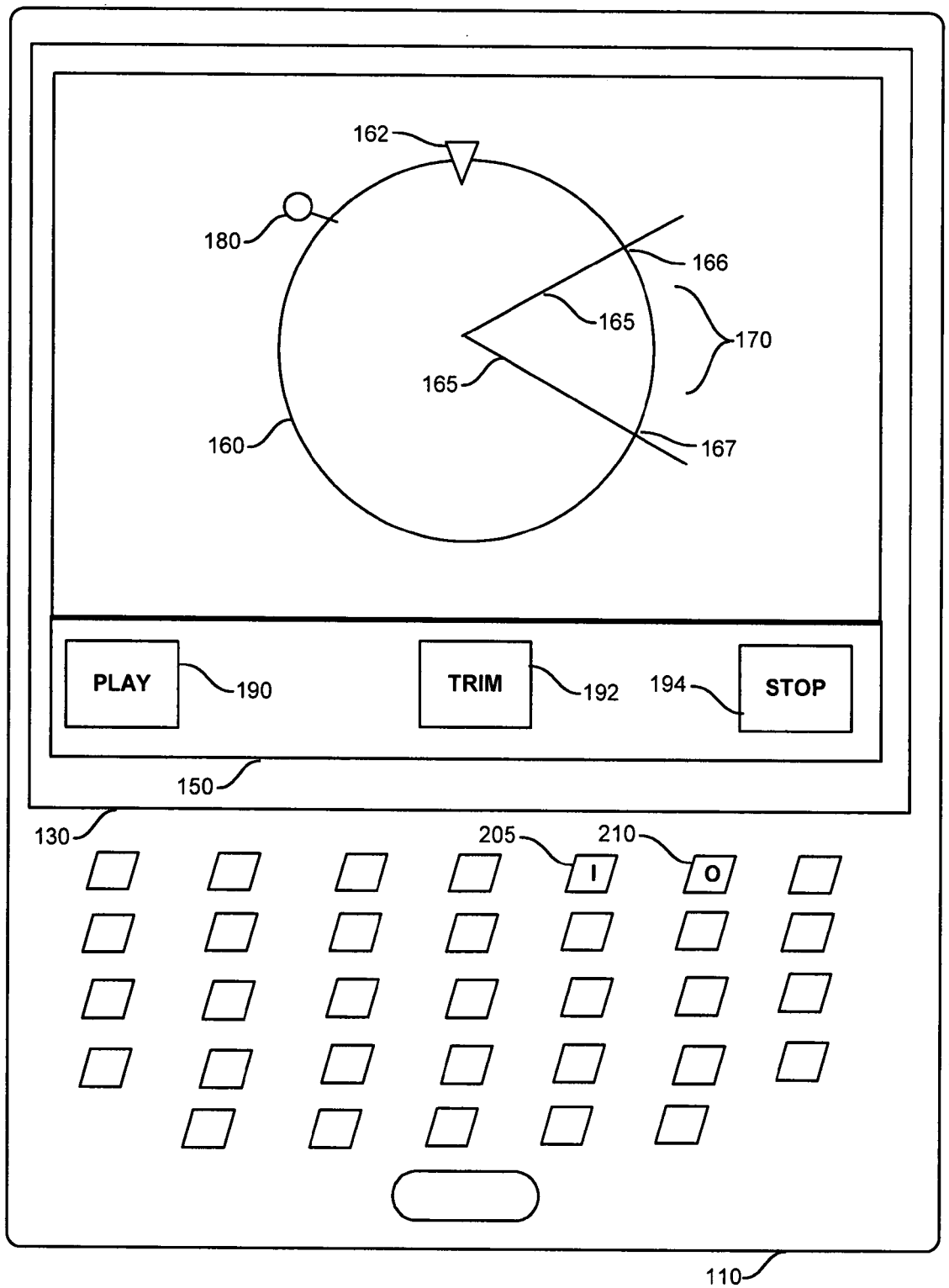
FIG. 4 is a block diagram illustrating a self-enclosed timeline trimmer configured to select an in-point and an out-point on the self-enclosed timeline according to embodiments herein.

Turning now to FIG. 4, a block diagram illustrating a self-enclosed timeline trimmer 150 configured to select an in-point and an out-point on the self-enclosed timeline according to embodiments herein is presented. A computer device 110 is a personal digital assistant (P.D.A.). The personal digital assistant 110 includes the self-enclosed timeline trimmer 150 presented on a display 130. A self-enclosed timeline 160 is placed over a video on the display 130 and the self-enclosed timeline 160 has a circular shape and has a play head indicator 162. The self-enclosed timeline trimmer 150 includes a segment selector 180 and a graphic selector 165 that selects an in-point 166 and an outpoint 167 to demarcate a span of time 170. The self-enclosed timeline trimmer 150 further includes a play button 190, a trim button 192 and a stop button 194 that allows the user 108 to control the video. The user 108 can control actions with the a graphic selector 165 via buttons "I" 205 and "O" 210 on the personal digital assistant 110.

Figure 5:
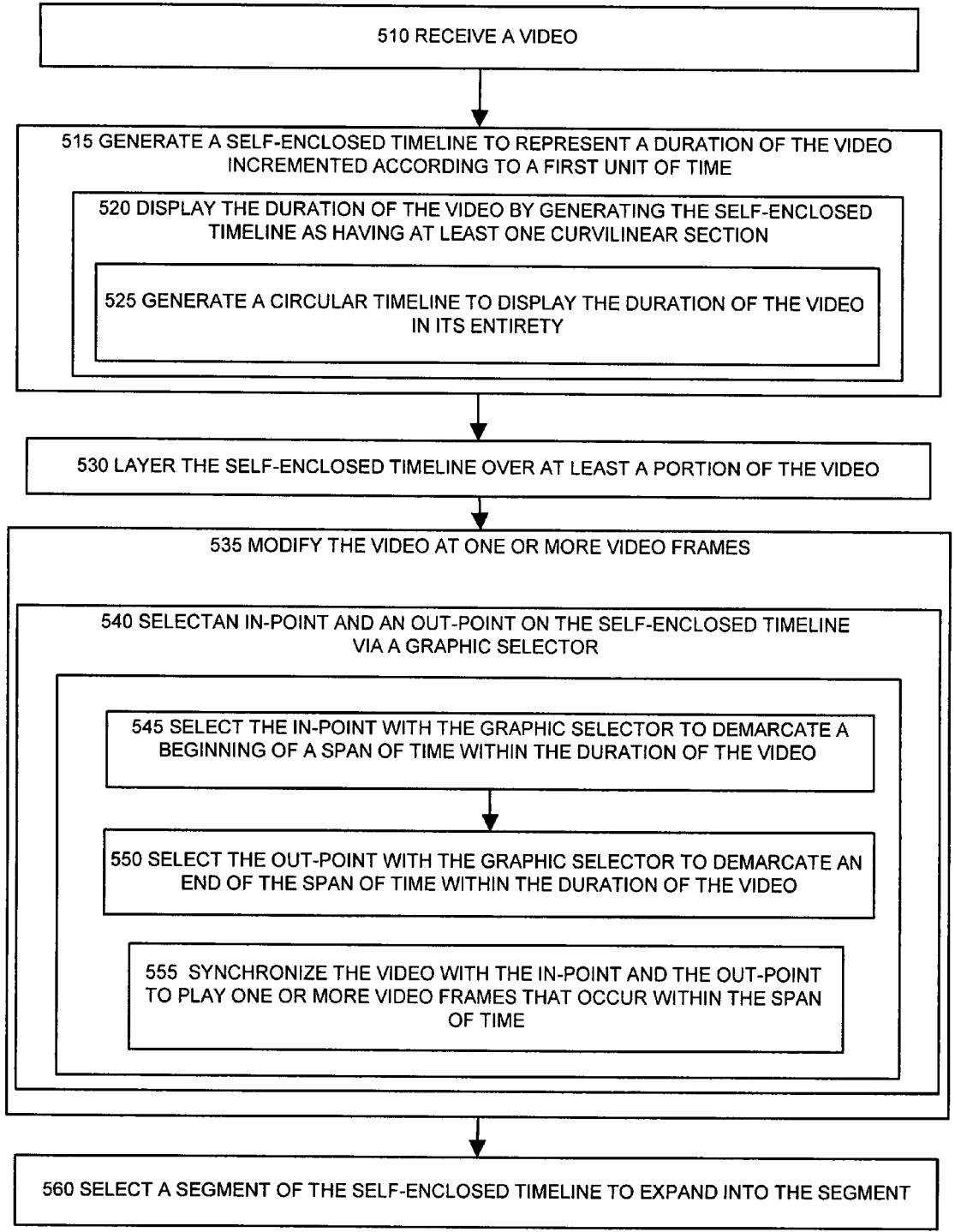
FIG. 5 is a flowchart of processing steps performed by the self-enclosed timeline trimmer according to embodiments herein.

FIG. 5 is a flowchart 500 of processing steps 510-560 performed by the self-enclosed timeline trimmer 150 according to embodiments herein. The steps in flowchart 500 refer to the features illustrated in the block diagram of FIG. 4.

In flowchart 500, at step 510, the self-enclosed timeline trimmer 150 receives a video. At step 515, the self-enclosed timeline trimmer 150 generates a self-enclosed timeline 160 to represent a duration of the video incremented according to a first unit of time. At step 520, the self-enclosed timeline trimmer 150 displays the duration of the video by generating the self-enclosed timeline 160 as having at least one curvilinear section. At step 525, the self-enclosed timeline trimmer 150 generates a circular timeline to display the duration of the video in its entirety. At step 530, the self-enclosed timeline trimmer 150 layers the self-enclosed timeline 160 over at least a portion of the video.

At step 535, the self-enclosed timeline trimmer 150 modifies the video at one or more video frames. In order to define where the video modification will occur, at step 540, the self-enclosed timeline trimmer 150 selects an in-point 166 and an out-point 167 on the self-enclosed timeline 160 via a graphic selector 165. At steps 545 and 550, the self-enclosed timeline trimmer 150 selects the in-point and the out-point with the graphic selector 165 to demarcate a beginning and an end of a span of time 170 within the duration of the video. The user 108 can utilize the graphic selector 165 of the self-enclosed timeline trimmer 150 to select both the in-point 166 and out-point 167. For example, the user 108 can position the graphic selector 165 at a desired location and press the "I" key 205 of the personal digital assistant 110 to select in-point 166. To select the out-point 167, the user 108 can position the graphic selector 165 at another desired location and press the "O" key 210.

At step 555, the self-enclosed timeline trimmer 150 synchronizes the video with the in-point 166 and the out-point 167 to play one or more video frames that occur within the span of time 170. For example, as the self-enclosed timeline trimmer 150 selects the in-point 166 with the graphic selector 165, the display 130 is updated to present the video frame of the video that occurs at the point in time represented by the in-point 166. Once the user 108 presses the play button 190, the video will play from that video frame of the video that occurs at the point in time represented by the in-point 166 until the video frame of the video that occurs at the point in time represented by the out-point 167. Further, in one embodiment, once the in-point 166 and the out-point 167 have been selected and define a span of time 170, the user can select the trim button 192 in order to modify the video.

At step 560, the self-enclosed timeline trimmer 150 allows the user 108 to place the segment selector 180 at a location on the self-enclosed timeline 160 in order to select a segment and expand the segment. The self-enclosed timeline trimmer 150 provides the segment selector 180 to "zoom" (e.g. enlarge, expand, magnify) the user-selected segment.

It is understood that the play head indicator 162 has a default position on the self-enclosed timeline 160 at the starting point of the video. As the video plays, the play head indicator 162 moves along the self-enclosed timeline 160 to indicate the point in time of the current video frame. The user 108 can also 'pause' the video and the play head indicator 162 will stop tracking the video and remain at a position on the self-enclosed timeline 160 that indicates the last video frame played prior to pausing. When the user 108 resumes playing the video, the video will start at the video frame that occurs just after the video frame played prior to pausing. The play head indicator 162 will resume tracking the video as well.

In addition, in one embodiment, the play head indicator 162 can perform the role of the graphic selector 165. In other words, as the play head indicator 162 moves along the self-enclosed timeline 160 in order to track a playing video, the user 108 can press the press the "I" key 205, as the play head indicator 162 encounters a position on the self-enclosed timeline 160, in order to select the in-point 166. The user 108 can also press the press the "O" key 210, as the play head indicator 162 encounters a later position on the self-enclosed timeline 160, in order to select the out-point 167.

Figure 6:
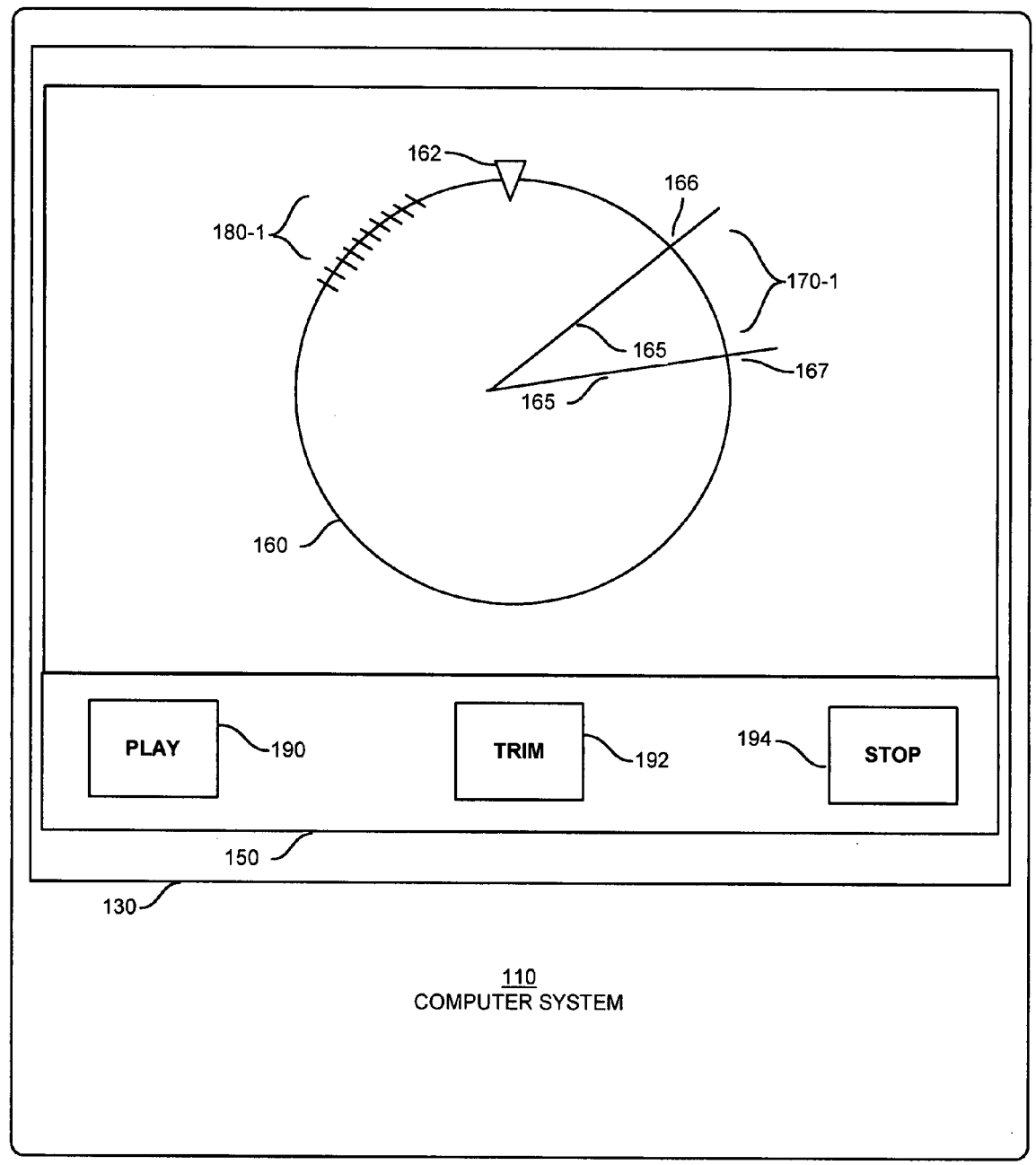
FIG. 6 is a block diagram illustrating a self-enclosed timeline trimmer configured to expand into a segment of the self-enclosed timeline according to embodiments herein.

FIG. 6 is a block diagram illustrating a self-enclosed timeline trimmer 150 configured to expand into a segment of the self-enclosed timeline according to embodiments herein. A computer device 110 (e.g. cellular telephone, personal digital assistant, mobile device, MP3 player) includes the self-enclosed timeline trimmer 150 presented on a display 130. A self-enclosed timeline 160 is placed over a video on the display 130 and the self-enclosed timeline 160 has a circular shape and has a play head indicator 162. The self-enclosed timeline trimmer 150 includes a graphic selector 165 that selects an in-point 166 and an out-point 167 to demarcate a span of time 170-1. The self-enclosed timeline trimmer 150 also includes a segment 180-1, displayed according to a smaller unit of time, that has been expanded into (e.g. "zoomed" into) with the segment selector 180 from FIG. 4. The self-enclosed timeline trimmer 150 further includes a play button 190, a trim button 192 and a stop button 194 that allows the user 108 to control the video.

Figure 7:
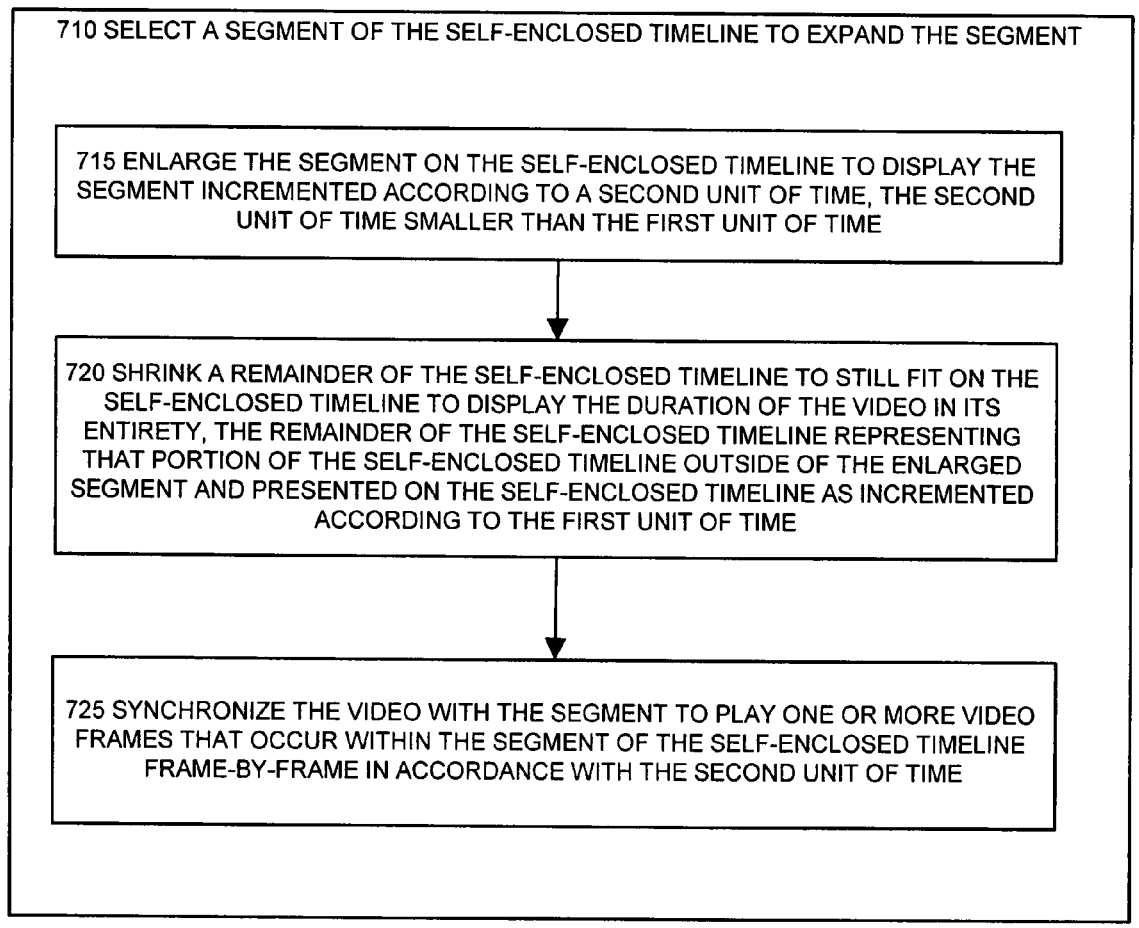
FIG. 7 is a flowchart of processing steps performed by the self-enclosed timeline trimmer according to embodiments herein.

FIG. 7 is a flowchart 700 of processing steps 710-725 performed by the self-enclosed timeline trimmer 150 according to embodiments herein. The steps in flowchart 700 refer to the features illustrated in the block diagram of FIG. 6. It is understood that expansion of a segment on the self-enclosed timeline 160 can occur before or after selection of an in-point 166 and/or an out-point 167.

In flowchart 700, at step 710, the self-enclosed timeline trimmer 150 selects a segment of the self-enclosed timeline to expand ("zoom") the segment. It is understood that selecting a segment of the self-enclosed timeline to expand the segment includes the segment selector 180 as a drag-and-drop functionality that can place the segment selector 180 on the self-enclosed timeline 160.

At step 715, the self-enclosed timeline trimmer 150 enlarges the segment 180-1 on the self-enclosed timeline 160 to display the segment incremented according to a second unit of time (represented as hash marks of segment 180-1 in FIG. 6). It is understood that the second unit of time is smaller than the first unit of time. In other words, if the self-enclosed timeline 160 is originally generated according to minutes, the enlarged segment 180-1 can be presented in terms of seconds. In another example, if the self-enclosed timeline 160 is originally generated according to hours, the enlarged segment 180-1 can be presented in terms of minutes.

At step 720, the self-enclosed timeline trimmer 150 shrinks a remainder of the self-enclosed timeline 160 to still fit on the self-enclosed timeline 160 to display the duration of the video in its entirety. It is further understood that the remainder of the self-enclosed timeline 160 is that portion of the self-enclosed timeline 160 that is outside of the enlarged segment 180-1. While the enlarged segment 180-1 is presented according to a smaller unit of time, the remainder is still presented on the self-enclosed timeline 160 as incremented according to the unit of time used when the self-enclosed timeline 160 was originally generated. Thus, if the self-enclosed timeline 160 is originally generated according to minutes, the remainder is still presented according to minutes.

At step 725, the self-enclosed timeline trimmer 150 synchronizes the video with the segment 180-1 to play one or more video frames that occur within the segment 180-1 of the self-enclosed timeline 160 frame-by-frame in accordance with the second unit of time. For example, once the segment 180-1 is enlarged (e.g. zoomed, expanded, magnified), the user can select the play button 190 in order to view the part of the video that occurs during the time that is represented by the enlarged segment 180-1.

Figure 8:
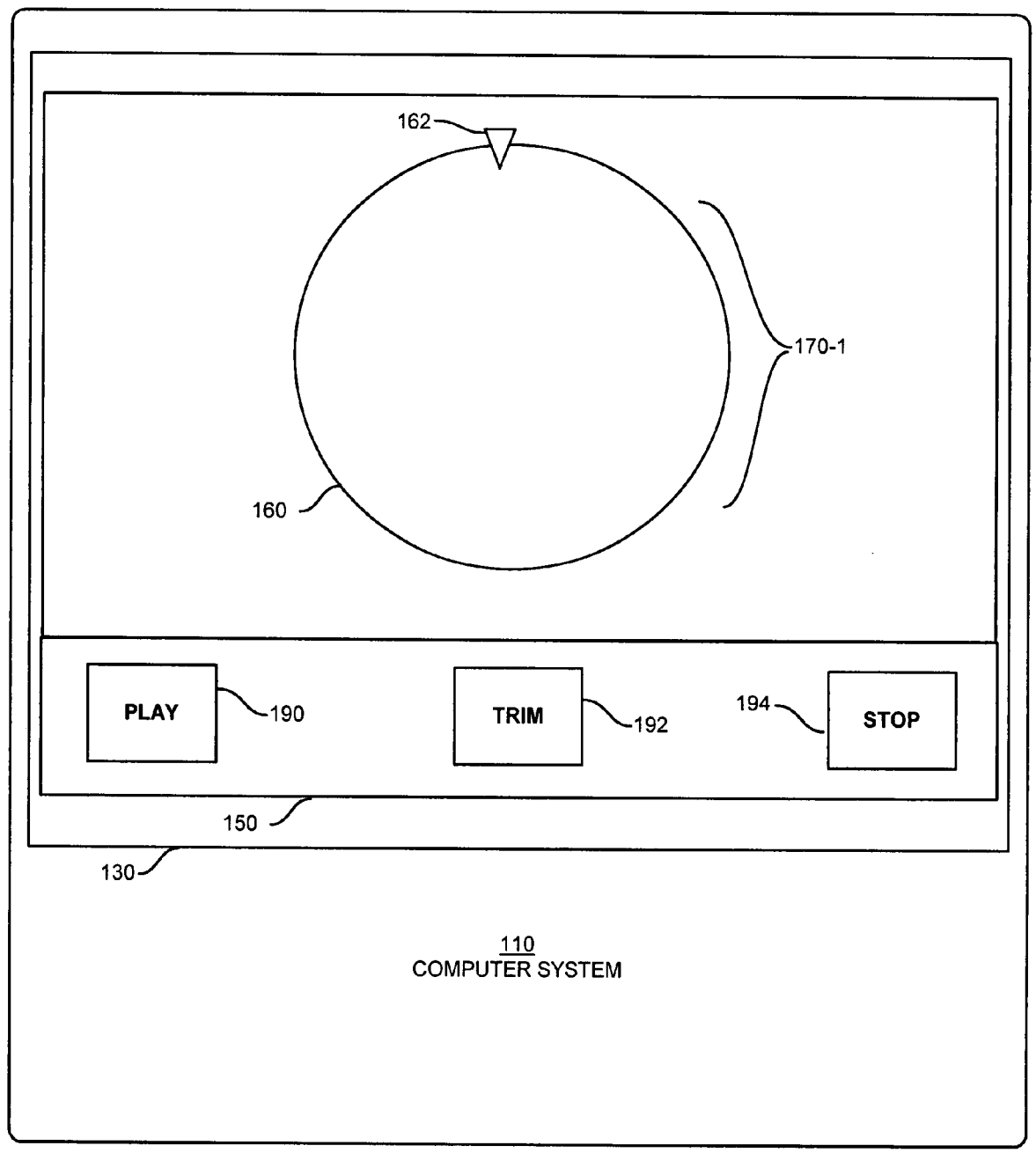
FIG. 8 is a block diagram illustrating a self-enclosed timeline trimmer configured to retain the video frames that occur within the selected in-point and out-point on the self-enclosed timeline according to embodiments herein.

Regarding FIG. 8, a block diagram is presented to illustrate a self-enclosed timeline trimmer 150 configured to retain the video frames that occur within the selected in-point and out-point on the self-enclosed timeline according to embodiments herein. A computer device 110 (e.g. cellular telephone, personal digital assistant, mobile device, MP3 player) includes the self-enclosed timeline trimmer 150 presented on a display 130. A self-enclosed timeline 160 is placed over a video on the display 130 and the self-enclosed timeline 160 has a circular shape and has a play head indicator 162. The self-enclosed timeline 160 represents the entirety of a span of time 170-1 that was retained from trimming (e.g. modifying) a previous version of the video. The self-enclosed timeline trimmer 150 further includes a play button 190, a trim button 192 and a stop button 194 that allows the user 108 to control the video.

Figure 9:
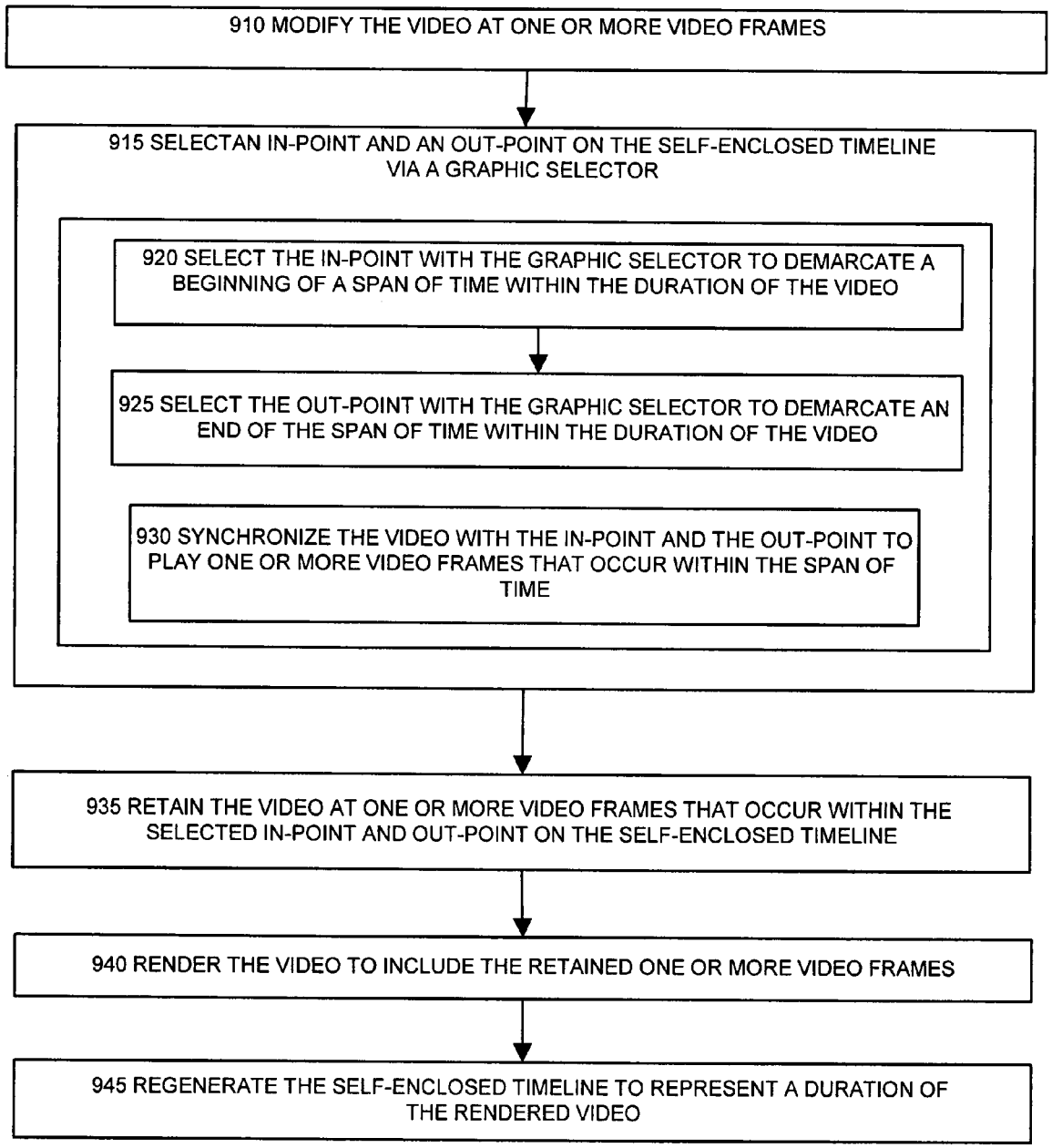
FIG. 9 is a flowchart of processing steps performed by the self-enclosed timeline trimmer according to embodiments herein.

FIG. 9 is a flowchart 900 of processing steps performed by the self-enclosed timeline trimmer 150 according to embodiments herein. Features illustrated in the block diagram of FIG. 8 are described in steps 935-950 of flowchart 900. However, steps 910-930 relate to features previously illustrated in FIG. 4.

In flowchart 900, at step 910, the self-enclosed timeline trimmer 150 modifies the video at one or more video frames. In order to define where the video modification will occur, at step 915, the self-enclosed timeline trimmer 150 selects an in-point 166 and an out-point 167 on the self-enclosed timeline 160 via a graphic selector 165. At steps 920 and 925, the self-enclosed timeline trimmer 150 selects the in-point and the out-point with the graphic selector 165 to demarcate a beginning of a span of time 170 within the duration of the video. At step 930 the self-enclosed timeline trimmer 150 synchronizes the video to play one or more video frames that occur within the span of time 170.

At step 935, the self-enclosed timeline trimmer 150 retains the video at one or more video frames that occur within the selected in-point 166 and out-point 167 on the self-enclosed timeline 160. At step 940, the self-enclosed timeline trimmer 150 renders the video to include the retained one or more video frames. At step 945, the self-enclosed timeline trimmer 150 regenerates the self-enclosed timeline 160 to represent a duration of the rendered video 170-1.

Hence, if the desired span of time 170 defined by the in-point 166 and out-point 167 is 75 seconds. The frames that occur within the 75 second span of time 170 are retained. The self-enclosed timeline trimmer 150 then renders the video to include only those frames that occur within the span of time 170 (the 75 second span of time). In addition, the self-enclosed timeline trimmer 150 regenerates the self-enclosed (e.g. circular) timeline 160 to graphically represent the entire duration 170-1 (75 seconds) of the rendered video.

Note again that techniques herein are well suited for generating a self-enclosed timeline to represent a duration of the video incremented according to a first unit of time. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   receiving a video;
   generating a self-enclosed timeline to represent a duration of the video, the self-enclosed timeline incremented according to a first unit of time, the self-enclosed timeline comprising a circular timeline;
   layering the circular timeline over at least a rendered portion of the video; and
   modifying the video at one or more video frames, which includes:
   receiving an identification of a first timeline segment;
   modifying display of the circular timeline to display the first timeline segment as visibly incremented according to a second unit of time, the second unit of time different than the first unit of time, the circular timeline representing a longer duration than the first timeline segment;
   while the circular timeline displays the first timeline segment as visibly incremented according to the second unit of time, receiving a selection of an in-point and a selection of an out-point, the in-point and out-point both respectively located on the circular timeline;
   creating a trimmed video, the trimmed video retaining only a plurality of video frames synchronized with a second timeline segment, the second timeline segment occurring on the circular timeline between the in-point and the out-point;
   rendering the trimmed video; and
   regenerating the circular timeline, the regenerated circular timeline representing only a duration of the trimmed video.

2. The method as in claim 1, wherein generating the self-enclosed timeline to represent the duration of the video according to the first unit of time includes:
   representing a start of the video on the self-enclosed timeline and an end of the video on the self-enclosed timeline; and
   displaying the duration of the video in its entirety by connecting the start and the end of the video on the self-enclosed timeline.

3. The method as in claim 1, wherein generating the self-enclosed timeline to represent the duration of the video according to the first unit of time includes displaying the duration of the video by generating the self-enclosed timeline as having at least one curvilinear section.

4. The method as in claim 1, wherein receiving the selection of the in-point and the out-point includes:
   receiving the selection of the in-point from a graphic selector to demarcating a beginning of a span of time within the duration of the video; and
   receiving the selection of the out-point from the graphic selector demarcating a end of the span of time within the duration of the video; and
   wherein demarcating the beginning and the end of the span of time within the duration of the video includes synchronizing the video with the in-point and the out-point to play one or more video frames that occur within the span of time.

5. The method as in claim 1, wherein receiving the identification of the first timeline segment includes:

receiving the identification of the first timeline segment via a drag-and-drop functionality to place a segment selector upon the the first timeline segment;

enlarging the first timeline segment on the self-enclosed timeline to display the segment incremented according to the second unit of time, the second unit of time smaller than the first unit of time;

shrinking a remainder of the self-enclosed timeline to still fit on the self-enclosed timeline to display the duration of the video in its entirety, the remainder of the self-enclosed timeline representing that portion of the self-enclosed timeline outside of the enlarged segment and presented on the self-enclosed timeline as incremented according to the first unit of time; and synchronizing the video with the segment to play one or more video frames that occur within the segment of the self-enclosed timeline frame-by-frame in accordance with the second unit of time.

6. The method as in claim 1, wherein receiving the video includes receiving the video on at least one of a mobile computer device, a wireless computer device, and a portable computer device.

7. A computer readable medium comprising executable instructions encoded thereon operable on a computerized device to perform processing comprising:
  instructions for receiving a video;
  instructions for generating a self-enclosed timeline to represent a duration of the video, the self-enclosed timeline incremented according to a first unit of time, the self-enclosed timeline comprising a circular timeline;
  instructions for layering the circular timeline over at least a rendered portion of the video; and
  instructions for modifying the video at one or more video frames, which include:
  instructions for receiving an identification of a first timeline segment;
  instructions for modifying display of the circular timeline to display the first timeline segment as visibly incremented according to a second unit of time, the second unit of time different than the first unit of time, the circular timeline representing a longer duration than the first timeline segment;
  instructions for receiving a selection of an in-point and a selection of an out-point while the circular timeline displays the first timeline segment as visibly incremented according to the second unit of time, the in-point and out-point both respectively located on the circular timeline;
  instructions for creating a trimmed video, the trimmed video retaining only a plurality of video frames synchronized with a second timeline segment, the second timeline segment occurring on the circular timeline between the in-point and the out-point;
  instructions for rendering the trimmed video; and
  instructions for regenerating the circular timeline, the regenerated circular timeline representing only a duration of the trimmed video.

8. The computer readable medium as in claim 7, wherein the instructions for generating the self-enclosed timeline to represent the duration of the video according to the first unit of time include:
  instructions for representing a start of the video on the self-enclosed timeline and an end of the video on the self-enclosed timeline; and
  instructions for displaying the duration of the video in its entirety by connecting the start and the end of the video on the self-enclosed timeline.

9. The computer readable medium as in claim 7, wherein the instructions for generating the self-enclosed timeline to represent the duration of the video according to the first unit of time include instructions for generating a circular timeline to display the duration of the video in its entirety.

10. The computer readable medium as in claim 7, wherein the instructions for receiving the selection of the in-point and the out-point includes:
  instructions for receiving the selection of the in-point from a graphic selector to demarcating a beginning of a span of time within the duration of the video; and
  instructions for receiving the selection of the out-point from the graphic selector demarcating a end of the span of time within the duration of the video; and, wherein demarcating the beginning and the end of the span of time within the duration of the video includes synchronizing the video with the in-point and the out-point to play one or more video frames that occur within the span of time.

11. The computer readable medium as in claim 7, wherein the instructions for receiving the identification of the first timeline segment include:
  instructions for receiving the identification of the first timeline segment via a drag-and-drop functionality to place a segment selector upon the first timeline segment;
  instructions for enlarging the first timeline segment on the self-enclosed timeline to display the segment incremented according to the second unit of time, the second unit of time smaller than the first unit of time;
  instructions for shrinking a remainder of the self-enclosed timeline to still fit on the self-enclosed timeline to display the duration of the video in its entirety, the remainder of the self-enclosed timeline representing that portion of the self-enclosed timeline outside of the enlarged segment and presented on the self-enclosed timeline as incremented according to the first unit of time; and
  instructions for synchronizing the video with the segment to play one or more video frames that occur within the segment of the self-enclosed timeline frame-by-frame in accordance with the second unit of time.

12. The computer readable medium as in claim 7, wherein the instructions for receiving the video include instructions for receiving the video on at least one of a mobile computer device, a wireless computer device, and a portable computer device.

13. A computer system comprising:
  a processor;
  a memory unit that stores instructions associated with an application executed by the processor; and
  an interconnect coupling the processor and the memory unit, enabling the computer system to execute the application and perform operations of:
    receiving a video;
    generating a self-enclosed timeline to represent a duration of the video, the self-enclosed timeline incremented according to a first unit of time, the self-enclosed timeline comprising a circular timeline;
  layering the circular timeline over at least a rendered portion of the video: and
  modifying the video at one or more video frames, which includes:
  receiving an identification of a first timeline segment;
  modifying display of the circular timeline to display the first timeline segment as visibly incremented according to a second unit of time, the second unit of time different than the first unit of time, the circular timeline representing a longer duration than the first timeline segment;

while the circular timeline displays the first timeline segment as visibly incremented according to the second unit of time, receiving a selection of an in-point and a selection of an out-point, the in-point and out-point both respectively located on the circular timeline;

creating a trimmed video, the trimmed video retaining only a plurality of video frames synchronized with a second timeline segment, the second timeline segment occurring on the circular timeline between the in-point and the out-point;

rendering the trimmed video; and regenerating the circular timeline, the regenerated circular timeline representing only a duration of the trimmed video.

14. The method as in claim 1, comprising:

while displaying the first timeline segment visibly incremented according to the second unit of time, displaying a third timeline segment, the third timeline segment incremented according to the first unit of time.

15. The method as in claim 1, wherein layering the circular timeline over at least a rendered portion of the video includes:

rendering at least the portion of the video in a video editing environment displayed on a screen of a wireless mobile telephone.

16. The method as in claim 1, wherein layering the circular timeline over at least a rendered portion of the video includes:

receiving a selection of a first area of the rendered portion of the video;

layering the circular timeline over the first area;

receiving a selection of a second area of the rendered portion of the video; and layering the circular timeline over the second area, the first area containing at least one different video pixel than the second area.

17. The method as in claim 1, wherein modifying display of the circular timeline to display the first timeline segment as visibly incremented according to the second unit of time includes:

while maintaining a size of the circular timeline, expanding a view of the first timeline segment on the circular timeline.

18. The method as in claim 17, wherein expanding the view of the first timeline segment on the circular timeline includes:

identifying a remainder of the circular timeline, the remainder of the circular timeline comprising every timeline segment other than the first timeline segment;

identifying a length of the first timeline segment;

identifying a length of the remainder;

identifying a first proportion, the first proportion describing a proportional relationship between a length of the first timeline segment and a size of the circular timeline;

identifying a second proportion, the second proportion describing a proportional relationship between a length of the remainder and the size of the circular timeline; and while maintaining the size of the circular timeline:
  i) increasing the first proportion in order to visibly increment the first timeline segment according to the second unit of time; and
  ii) decreasing the second proportion.

19. The method as in claim 17, comprising:

upon expanding the view of the first timeline segment, receiving a selection to play each video frame synchronized with the first timeline segment.

20. The method as in claim 1, comprising:

while displaying the first timeline segment visibly incremented according to the second unit of time, displaying a third timeline segment, the third timeline segment incremented according to the first unit of time;

wherein layering the circular timeline includes:

receiving a selection of a first area of the rendered portion of the video;

layering the circular timeline over the first area;

receiving a selection of a second area of the rendered portion of the video; and layering the circular timeline over the second area, the first area containing at least one different video pixel than the second area;

wherein modifying display of the circular timeline includes:

while maintaining a size of the circular timeline, expanding a view of the first timeline segment on the circular timeline; and upon expanding the view of the first timeline segment, receiving a selection to play each video frame synchronized with the first timeline segment;

wherein expanding the view includes:

identifying a remainder of the circular timeline, the remainder of the circular timeline comprising every timeline segment other than the first timeline segment;

identifying a length of the first timeline segment and a length of the remainder;

identifying a first proportion and a second proportion, the first proportion describing a proportional relationship between a length of the first timeline segment and a size of the circular timeline, the second proportion describing a proportional relationship between a length of the remainder and the size of the circular timeline;

increasing the first proportion in order to visibly increment the first timeline segment according to the second unit of time; and decreasing the second proportion.

* * * * *